United States Patent [19]
Larson

[11] Patent Number: 5,425,968
[45] Date of Patent: * Jun. 20, 1995

[54] METHOD AND APPARATUS FOR THE REFINISH APPLICATION OF MULTICOMPONENT COATING COMPOSITIONS

[75] Inventor: John C. Larson, Clarkston, Mich.

[73] Assignee: E. I. Du Pont de Nemours and Company, Wilmington, Del.

[ * ] Notice: The portion of the term of this patent subsequent to Nov. 9, 2010 has been disclaimed.

[21] Appl. No.: 203,713

[22] Filed: Nov. 8, 1993

Related U.S. Application Data

[63] Continuation of Ser. No. 813,183, Dec. 24, 1992, abandoned.

[51] Int. Cl.6 ................................. B05D 3/02
[52] U.S. Cl. .................. 427/372.2; 427/421; 427/426; 137/99
[58] Field of Search ............... 137/99; 427/372.2, 421, 427/426

[56] References Cited

U.S. PATENT DOCUMENTS

| | | | |
|---|---|---|---|
| 2,679,208 | 5/1954 | Euverhart | 103/49 |
| 3,530,873 | 8/1970 | Arp et al. | 137/99 |
| 3,672,389 | 6/1972 | McConnell et al. | 137/99 |
| 3,776,252 | 12/1973 | Wilcox | 137/99 |
| 3,967,634 | 7/1976 | Scherer et al. | 137/99 |
| 4,265,858 | 5/1981 | Crum et al. | 137/99 |
| 4,440,314 | 4/1984 | Vetter et al. | 137/99 |
| 4,529,000 | 7/1985 | Funk | 137/99 |
| 4,953,754 | 8/1990 | Credle, Jr. | 222/129 |
| 4,966,306 | 10/1990 | Credle, Jr. et al. | 221/1 |
| 5,075,140 | 12/1991 | Stout et al. | 427/421 |
| 5,260,101 | 11/1993 | Larson et al. | 427/426 |

FOREIGN PATENT DOCUMENTS 2914684 4/1981 Germany.

Primary Examiner—Shrive Beck
Assistant Examiner—Katherine A. Bareford

[57] ABSTRACT

An improved method and apparatus for applying a multicomponent coating composition onto a substrate. The method comprises separately transporting at least one component under pressure to a proportioning device which provides a controlled ratio of the components. The components of the coating composition are then mixed and coated onto the substrate at ambient temperature or, to accelerate curing, at moderate temperatures. The method is especially useful for applying multipackage refinish coating compositions.

14 Claims, 4 Drawing Sheets

METHOD AND APPARATUS FOR THE REFINISH APPLICATION OF MULTICOMPONENT COATING COMPOSITIONS

This is a continuation, of application Ser. No. 07/813,183 filed Dec. 24, 1992, now abandoned.

BACKGROUND OF THE INVENTION

This invention relates to an improved method and apparatus for applying a multicomponent coating composition to a substrate to refinish the same. In particular, the present method involves metering and proportioning a controlled ratio of the components of the system, prior to mixing. The ratioed components are then sprayed immediately onto the substrate. This invention is especially useful in the automotive refinish industry for such coatings as clearcoats, basecoats, and primers.

There presently exists a variety of systems for proportioning components and delivering them to atomizers or dispensing equipment in proper ratios. For example, such systems are disclosed in U.S. Pat. No. 4,966,306; U.S. Pat. No. 4,953,754; U.S. Pat. No. 4,529,000; U.S. Pat. No. 3,776,252; U.S. Pat. No. 3,672,389; and U.S. Pat. No. 3,530,873. Devices for proportioning coating compositions are marketed and have found wide use in original equipment manufacturing (OEM) of automobiles and other industrial equipment. However, such devices are not generally used in automotive refinish or body shops, where only one vehicle at a time is normally painted or finished.

The term "automotive refinish" refers to the application of a finish to an automobile subsequent to the original manufacturing process. In the OEM factory, the metal body of an automobile is typically coated or painted in an assembly line process, permitting the use of coating compositions on a large scale which are cured at elevated temperatures, typically as high as 150°–160° C. However, once the car has been fitted with plastic bumpers, rubber tires, and the like, it is no longer feasible to cure finishes at high temperatures. In the automotive refinish context, coatings normally are cured at ambient temperatures, although cure time may be accelerated by heating to temperatures up to 80° C.

In refinish applications, the coating material being applied to a substrate as a finish is typically the product of a multipackage system that has been mixed manually prior to use. In a typical two component system, the first package is composed primarily of an acrylic interpolymer containing crosslinking monomer units. The second package is composed of the crosslinking agent required to react with the polymer in the first package. The proper volumetric mix ratio of the components is determined by the proper stoichiometric ratios of the reactive parts of the components needed for the crosslinking reaction to take place. Either package may also contain catalysts for promoting and initiating the crosslinking reactions, as well as additives, reducers, and pot life extenders. In some cases, more than two packages or components may be involved, for example, a catalyst may be present in a third component.

Conventional refinish methods, for applying a coating composition to a substrate, have been limited in several significant respects. Typically, the components of the coating composition are mixed manually. Once mixed, the composition must be used within a certain time frame. The potlife is defined as the time during which the mixture is suitable for spraying. More specifically, it is the point at which the applicator can perceive a discernable difference in the ease of handling due to an increase in the viscosity of the mixed components. This time frame is subjective and can vary, depending on the particular reaction involved, from an increase of several seconds to tens of seconds, according to a Zahn #2 measurement of viscosity. The Zahn cup is a fixed volume cup with specific orifice size. The amount of time it takes for a particular mixture to flow through the orifice is indicative of the viscosity of the mixture. Although this pot life characterization is to some extent subjective and dependent on the chemistry and applicator, in general, for the present purposes, pot life will be defined as a doubling of the viscosity (centipoise). For conventional applications, the paint or finish material must have a pot life of at least about 2–3 hours in order to give the user ample time to effect the refinishing task. Such a constraint limits the formulating latitude of the coating formulator. In particular, new high solids and-/or low VOC (i.e., low content of volatile organic compounds) compositions have been difficult to develop because of problems of short pot life with such compositions. Such high solids compositions for coatings tend to exhibit a shorter pot life and rapid increases in viscosity, due to the higher concentration of reactants. This is hown in FIG. 4. This can present problems in applying them to substrates. On the other hand, if stabilizers or extenders are added to the formulation of the finish composition to increase the pot life, then the film drying and curing time is extended. This will increase the length of time needed to complete a job, thereby decreasing the productivity of the refinishing task. In addition, when the finish of an automobile is still wet, it is more susceptible to the introduction of defects, for example, caused by either accidental rubbing or air-bore contamination such as dust and dirt.

In view of the above, there is a need for an improved method of applying a refinish coating composition to an automobile or the like. It would be particularly desirable to solve the problems or difficulties associated with the formulation and spraying of high solids, low VOC coating compositions.

BRIEF DESCRIPTION OF THE INVENTION

The present invention is directed to an improved method of applying a coating composition to a substrate that dries and cures at temperatures ranging from about ambient to 80° C., but preferably at ambient. The coating composition comprises a plurality of components. For example, in a two package system, each of two components are proportioned and mixed, and the combined composition, after application to the substrate, undergoes a crosslinking polymerization reaction, dries and cures. The method comprises the following steps:

(a) supplying each of a plurality of separate components, which form the final coating composition, at least one component of which is supplied under pressure;

(b) transporting each component in a stream through a conduit leading from said container to a common proportioning device, essentially powered by said pressure, to provide a controlled volumetric ratio of the components, which ratio corresponds to the proper stoichiometric ratio for the chemistry of the compositon;

(c) homogenously mixing the components of the coating composition; and (d) spraying or coating the mixed composition onto the surface of a substrate.

The present method has several advantages for use in the automotive refinishing industry. In general, the invention provides a method for applying a multicomponent crosslinking coating composition of any given VOC where the system is highly reactive or the functionality and/or catalyst level can be increased to speed film property development without regard to pot life. This is rendered possible because the components do not mix until they reach the spray gun or proximity thereof.

The present method can be used to apply faster drying and curing finishes or paints which will increase productivity in the finishing process. In addition, the present method might improve the occupational health of workers in the field, since it would not be necessary to manually mix multicomponent compositions containing toxic materials, which reduces potential for exposure of workers to the toxic materials.

According to one embodiment of the method, a simple, compact, self driven, and inexpensive metering or proportioning device is employed to volumetrically proportion the component compositions. In steady state operation, each of the component composition streams are first directed through a fluid control means or valve, and thereafter directed, in a cyclical manner, alternately into the first and second, or left and right, ends of a double acting cylinder fitted with a piston. In the first part of the cycle, each component, at least one under pressure, is introduced into a first end of the cylinder, through a first passageway. This effects the movement of the piston which forces a corresponding amount of the component composition, having previously entered the cylinder on the other side of the piston, out the second end of the cylinder through a second passageway. When the piston completes its movement towards the second end of the cylinder, the fluid control valve alternates the passageways for moving the component composition into and out of the cylindrical chamber, so that in a second part of the cycle, the piston is then moved, under pressure of the incoming component, in the opposite direction, now to the first end of the cylinder, thereby forcing the component composition, having entered that end in the first part of the cycle, out of the cylinder through the first passageway. During the aforedescribed cyclical operation, the piston moves alternatively towards opposite ends of the cylinder. A separate cylinder and piston may be used for each component composition, although various configurations of pistons and cylinders and their cooperation are available to the skilled artisan for use in such a proportioning device. However, in the present embodiments, the movement of the separate pistons are simultaneous, by physical connection or other means, and the stroke length of each is the same. By this means, if only one component is supplied under pressure, it can provide the energy to "pump" the other components through the proportioning device.

In another aspect of the present invention, a novel apparatus is disclosed which can be used for applying a refinish coating composition.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE INVENTION

The invention is directed to an improved method and apparatus for applying a multicomponent coating composition, which composition may be used to refinish automobiles or other substrates. The method involves the use of an inexpensive, self diriven, simple volumetric proportioning device which may be used to supply the components of the coating composition in the proper mix ratio to an atomizer or other coating device. As indicated above, several significant benefits of the present invention may be realized. The invention can reduce the risk of human exposure to harmful or toxic volatiles by not requiring manual measuring and mixing of the components of the coating composition prior to spraying. This also reduces labor, as well as eliminating waste generation from cleaning the measuring and mixing equipment. Another advantage is that lower VOC, quicker drying compositions may be more easily used. Such compositions are better for the environment. However, the invention is not necessarily limited to the use of low VOC paints, and conventional compositions may be used.

Figure 1:
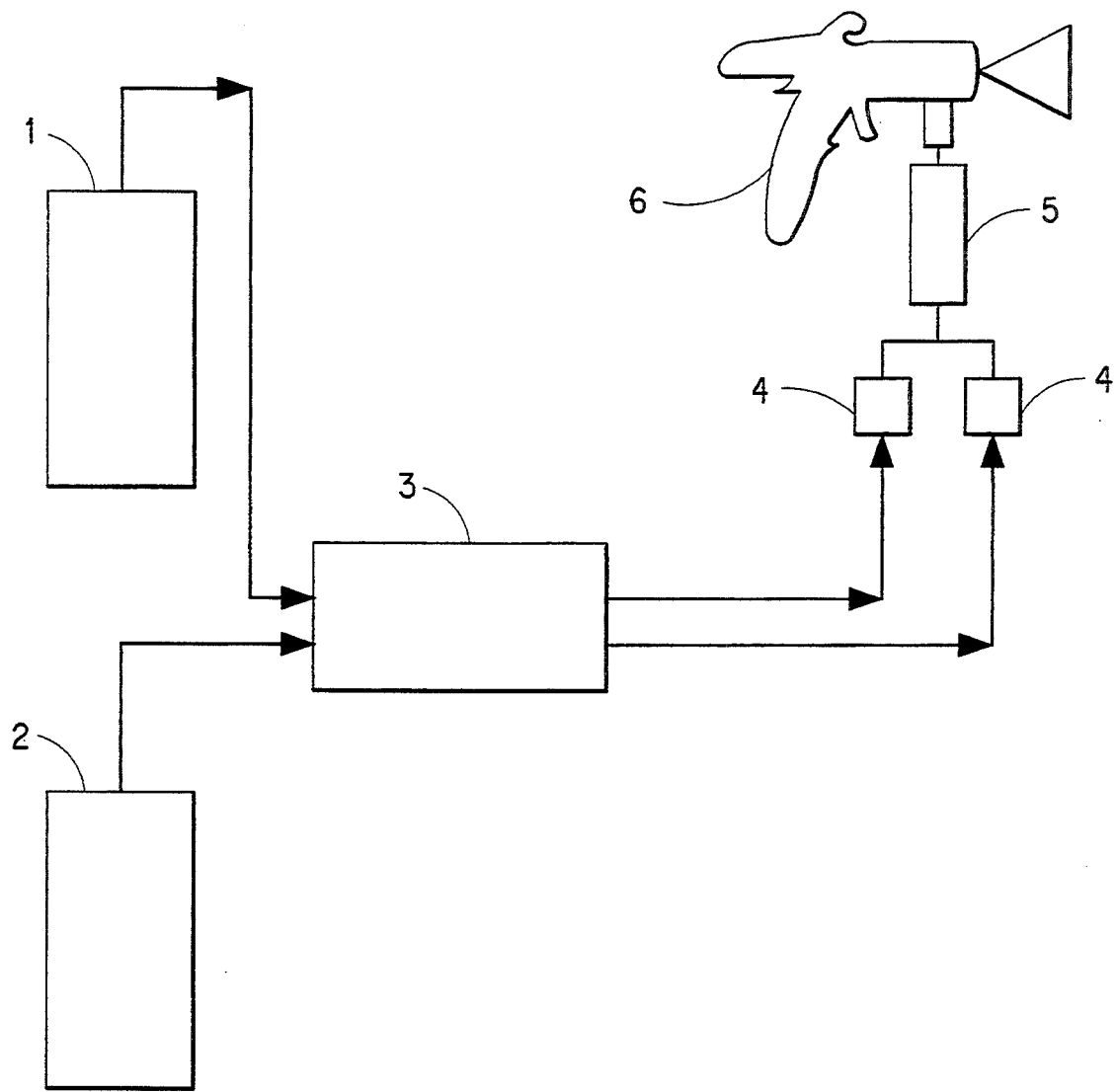
FIG. 1 is a diagram of a system for applying a coating composition, which system comprises a means for supplying, proportioning, mixing and spraying the composition according to the present method.

With reference to the drawings, FIG. 1 shows one embodiment of a system for practicing the invention, including containers of coating materials, a volumetric proportioner, a static mixer, and a spray gun. A volumetric proportioner 3 is shown connected, at one end, to separate supplies of the components of the coating composition. A component A in supply container 1 and a component B in supply container 2 are both connected to the volumetric proportioner 3 which provides a controlled ratio of the two components to a static mixer 5. A check valve 4 in each line prevents backflow of the mixed composition. The mixed composition enters a coating device, in this case a spray gun 6, for spraying the paint onto a substrate such as an automobile surface being refinished. Although, in the embodiment shown, the mixer 5 is a separate device located between the volumetric volumetric 3 and the spray gun 6, an alternative arrangement is to have the mixer as an integral part of the spray gun 6. In fact, it is possible for the volumetric proportioner, mixer, and spray means to be integrated into a single compact unit.

The coating material to be sprayed may be supplied in a standard container or a container customized for use in the present invention. In the case of standard containers, they may be opened (the top lid removed) and placed in a larger capacity enclosure, such as a pressure pot, under pressure. Alternatively, only one of the components need be supplied under pressure to operate the volumetric proportioner. It can provide the pumping action for the other components. A suitable pressure is 20 to 80 psig, which is readily obtained from a standard source of compressed air, commonly available in a refinish or body shop. Alternatively, a conventional pump may be employed to provide a component under pressure to the proportioner. However, the volumetric proportioner will operate at much higher fluid pressures. With properly designed systems the proportioner could be used to feed air assisted airless spray systems (400 or more psia) or airless spray systems (2000–3000 psia).

In one simple embodiment for a two package system, the two containers of the two package system are opened, vented to the atmosphere, and placed in a pressure pot under the necessary pressure. Each of two dip tubes or the like are placed within the fluid contents of each of the two containers and connected to the volumetric proportioner as described in more detail below.

A customized container for supplying the component compositions may be used. Such a container may suitably be made of metal, such as aluminum or steel, or composite plastic. Such a customized container, however, must be capable of withstanding the pressures employed in the present method and remaining air tight. The container may be non-returnable or returnable. In one embodiment, the container has an inlet means for allowing the introduction of compressed air or other gas under pressure and an outlet means for allowing the coating material to be delivered for use. The outlet means of the container may include a dip tube extending toward the bottom of the container and couplings or fittings for connection to conduits or hoses as needed. The inlet means of the container may have a one way valve for use in pressurizing the container. The inlet and outlet means may be incorporated into a removable lid of a container if desired. It will be apparent to the skilled artisan that when only one of the containers is being pressurized and used to actuate the volumetric proportioner, then the other containers should be vented.

Figure 2:
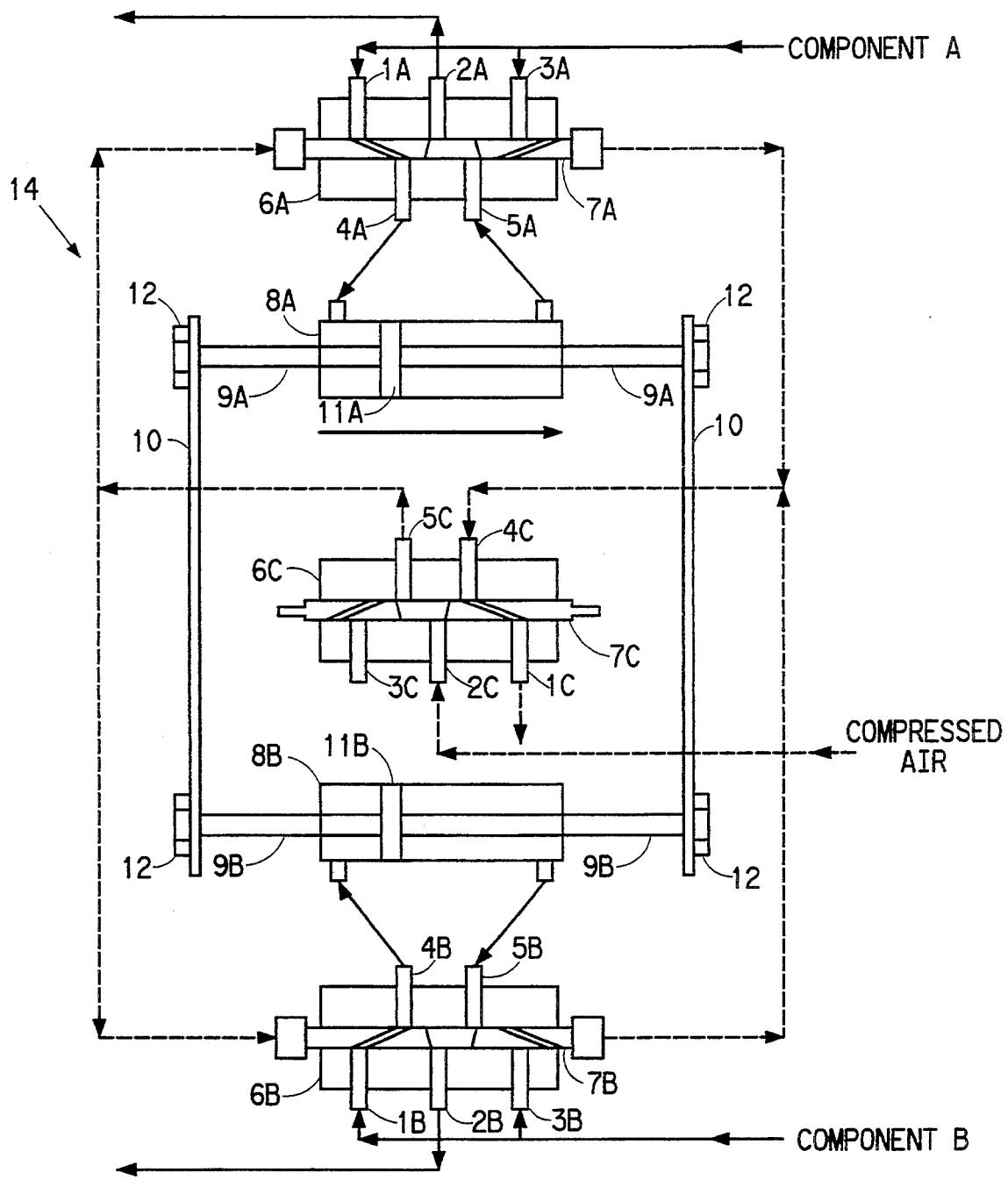
FIG. 2 is a top cross-sectional view of one embodiment of a proportioning device employed in the present invention.

Turning now to FIG. 2, we see a diagram of one embodiment of a proportioning device 14, hereafter referred to as a volumetric proportioner, as it uses only the kinetic energy of the cone component under pressure to drive itself, for use with a two package system made up of components A and B. The skilled artisan will readily appreciate that the design of this embodiment can be analogously modified for a three or more package system.

The kinetic proportioner comprises two double acting cylinders 8A and 8B with cylinder rods 9A and 9B that are attached to pistons 11A and 11B. The cylinder rods extend out of the cylinders to common brackets 10. The rods for the cylinder 8A and 8B are fixed to the common brackets 10 with nuts 12. The common brackets force the pistons 11A and 11B to move simultaneously. There are fluid control valves 6A and 6B for each of the components being proportioned (component A and component B in FIG. 2). There is also an air control valve 6C that provides pilot control air to the fluid control valve spools 7A and 7B. The fluid control valve spools are designed such that fluid can be directed alternately in and out of ports 4A and 5A, as well as 4B and 5B, as the spool is positioned (by pilot air) alternatively to the right and left.

In normal operation for a two component proportioner, fluid components A and B come to the volumetric proportioner under pressure from a supply source. In the following description, each number referred to in FIG. 2 may be followed by A or B, depending on which fluid component A or B is involved. Each fluid is directed to ports 1 and 3 (1A and 3A or 1B and 3B) of its respective control valve. When spools 7A and 7B are in their right position, as shown in FIG. 2, the fluid components A and B enter into the control valves through ports 1A and 1B, respectively. The spools 7A and 7B direct the fluid component out of the ports 4A and 4B. The fluids then enter into the left end of their respective cylinders 8A and 8B. Pistons 11A and 11B are forced to move to the right (both cylinders simultaneously). As the pistons move, fluid on the fight side of the piston is displaced out through the the right end of the cylinders 8A and 8B. Fluid A (from cylinder 8A) and fluid B (from cylinder 8B) enter their respective fluid control valves (6A and 6B) through ports 5A and 5B. The spools 7A and 7B direct the fluids out ports 2A and 2B to the mixer and spray device.

As shown in FIG. 2, the compressed air enters the control or pilot valve 6C through conduits or passageways 2C and 5C, to enter the left side of the component fluid valve spools 7A and 7B, and exits through conduits 4C and 1C. However, when pistons 11A and 11B reach the end of their movement to the left, common bracket 10 physically strikes spool 7C in the air control valve 6C. This redirects the pilot air signal through conduits 2C and 4C and the right side of the fluid control valve spools 7A and 7B, moving the spools to their left position, and the air exits through conduits 5C and 3C. In this position, the fluids A and B enter the control valves through ports 3A and 3B, and the fluid flows are reversed. Fluids A and B flow out ports 5A and 5B to the right end of cylinders 8A and 8B, moving pistons 11A and 11B to the left. This displaces fluids A and B on the left side of the pistons, and into ports 4A and 4B on the control valves 6A and 6B, where the fluids are directed out ports 2A and 2B by the spools 7A and 7B.

This cycle is repeated continuously to give a steady flow of fluid A out port 2A and fluid B out port 2B. The volumetric flow ratio of the two fluids is dependent on the ratio of the volumetric displacement of the fluids as each piston travels its entire stroke length. Because the piston movement of the two cylinders is fixed together, their stroke length is equal; and because each cylinder's displacement is a constant, this results in controlled volumetric ratio between the fluids.

The proportioned fluids A and B are directed to a spray device through hoses or tubings. Just prior to the spray device or as an integral part of the spray device, the components are mixed, for example, using a static in-line mixer. Check valves are used for each fluid just prior to the static mixer to prevent back flow of one fluid into the hose or tube of the other.

The embodiment as shown in FIG. 2 could be modified to eliminate the pilot air control valve. Fluid control valves 6A and 6B could be located between the cylinders (8A and 8B) similar to how air control valve 6C is oriented. In this modification, fluid control valves 6A and 6B would be actuated by bracket 10 physically striking and moving spools 7A and 7B. This would eliminate the need for the air control valve and the pilot air signal tubes. As a result, the device would operate without any other source of energy other than the fluid pressure of one or more of the components.

Figure 3:
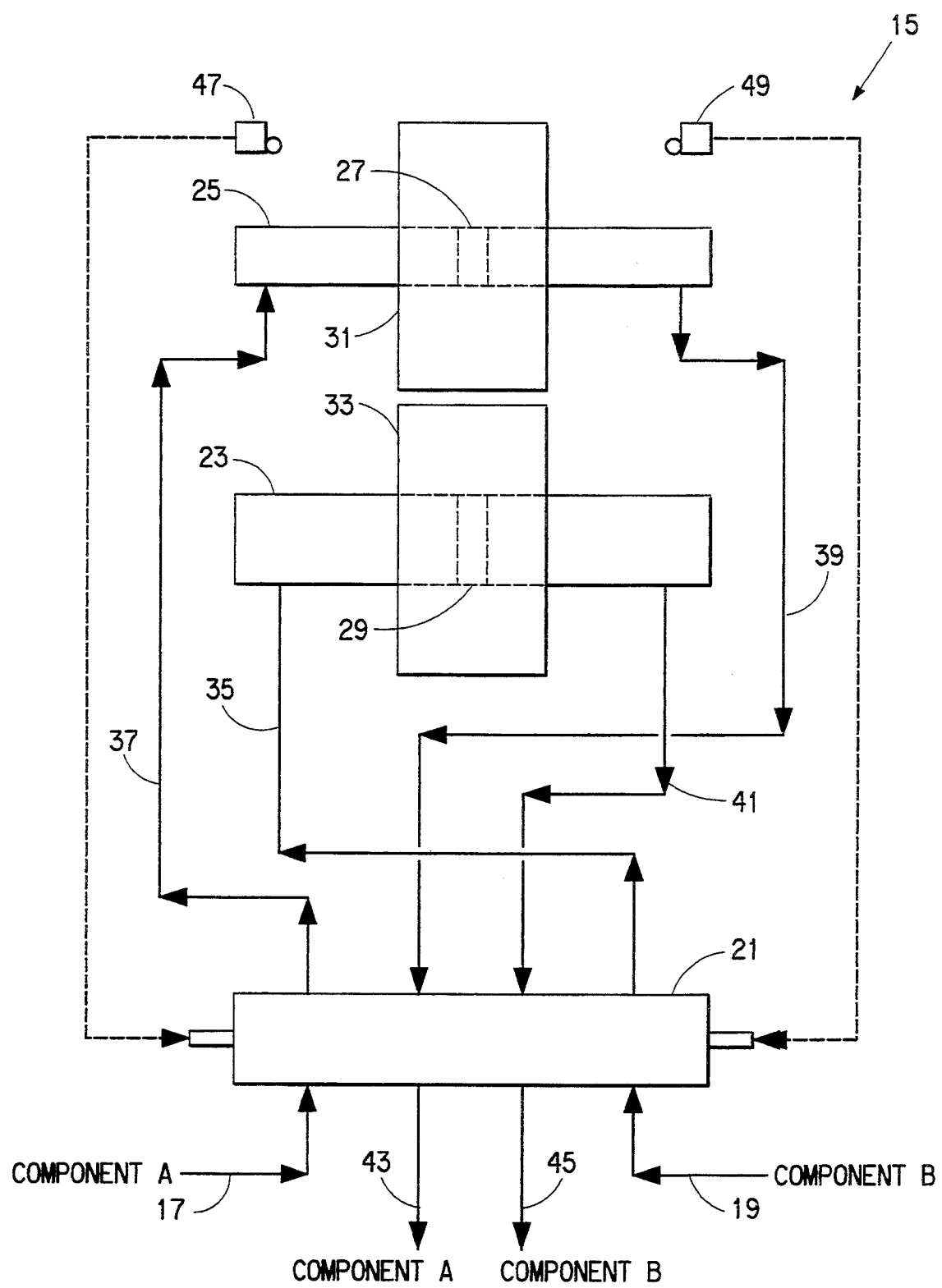
FIG. 3 is a top cross-sectional view of a second embodiment of a proportioning device employed in the present invention.

A diagram of a second embodiment of the invention is shown in FIG. 3. Two conduits 17 and 19 serve to transport and supply component A and component B, respectively, to the kinetic proportioner shown as 15.

The conduits 17 and 19 lead to a fluid control valve 21 (which may the same as shown in FIG. 2) for directing each of component A and component B to cylinder 23 and cylinder 25, respectively. These cylinders each have a piston 27 and 29, respectively, fittingly adapted for movement as described below. In the embodiment shown in FIG. 3, piston followers 31 and 33 corresponding to each piston are connected magnetically to the pistons and are physically connected to each other in order to assure synchronous movement of the two pistons. It will be understood by the skilled artisan that other arrangements are possible. For example, although separate cylinders and pistons are shown in FIG. 3, various other configurations may be employed. For example, in U.S. Pat. No. 4,966,306, an arrangement is shown in which a first cylinder and piston is concentric to another cylinder and piston. In an alternate embodiment, two pistons and cylinders may be in series with the piston shafts connected.

In operation, the control valve 21 is designed such that when in a first position, the components A and B can flow into the two cylinders though a first set of passageways 35 and 37, respectively, while the components A and B are displaced out the two cylinders through a second set of passageways 39 and 41 to conduits 43 and 44, respectively. When the pistons 27 and 29 reach the end of their strokes, the control valve 21 is energized to change position and, in a second position, to provide connection of the inlet conduits 17 and 19 with the second set of passageways 39 and 41, while the components A and B are forced out of the cylinders through the first set of passageways 35 and 37 into outlet conduits 43 and 45, respectively. These components in conduits 43 and 45 are then transported to a mixer and spray device, as indicated above.

With a two package system consisting of component A and B, for example, the kinetic proportioner operates on the principle of simultaneous displacement of fluids from two double acting cylinders. The cylinders in FIG. 3 are operated with their pistons locked together, by means of the piston followers, so they synchronously utilize the same stroke length. The piston followers are connected to the pistons by way of magnetic coupling. The volumetric displacement of each cylinder is proportional to the square of its inside diameter. In the embodiment of FIG. 3, by varying the diameter of one or more of the cylinders, one can change the proportioning ration and thus change the stoichiometric ratio of the components involved in the crosslinking reaction. In the embodiment of FIG. 2, changing the diameter(s) of the cylinders as well as the cylinder rods will also vary the proportioning ratio. At least one of the two components, as indicated above, are fed to the proportioning device under pressure. Preferably, this fluid pressure drives the two cylinders with no other energy source required, except for the case when compressed air is used to pilot the control valve. Although less preferable, the control valve may be operated with electrical solenoid valves. Conventional electronic circuitry may be used to operate the control valve. Such a circuit is disclosed in U.S. Pat. No. 4,966,306.

In FIG. 3, as the fluid components move the pistons in the cylinders toward the opposite end of the cylinders, stroke limit switches 47 and 49 sense the position of the followers just before the piston reaches the end of the cylinder. The limit switch sends a pilot signal to the control valve, and moves a spool in the control valve. When this happens, the direction of the liquids in the cylinders is reversed, and the pistons are forced toward the other end of the cylinders.

As the pistons move, they displace the liquids from the cylinders simultaneously. The displaced liquids are pushed through the control valve and to the static mixer and the spray gun. In the case of a rodless cylinder, the liquids are displaced in a volume ratio equal to the ratio of the squared diameters of the cylinders. The piston followers trigger a limit switch and the process is repeated continuously. The speed of movement of the pistons is proportional to the fluid pressure applied. Of course, the fluid flow is increased as the fluid pressure and piston speed is increased. The fluid stream from the spray gun is extremely steady with no noticeable pulsing. Pulsation dampening is not necessary.

The present proportioning device, in contrast to existing equipment used in other applications, does not require any motors or, in its preferred embodiment, any source of power other than the pressure on one or more of the liquid fluids being applied to move the pistons. As indicated above, the pressure of the incoming liquid fluid, on one side of the piston, causes the piston to move in a first direction, which piston in turn causes a corresponding amount of the same liquid fluid, present on the opposite side of the piston, to be displaced and expelled out the other end of the cylinder. Exiting the cylinder, the liquid fluid is transported via a second passageway and, through the control valve, into an outlet conduit leading towards the spray device.

The kinetic proportioner is self-driven in that internal electric motors or pumps are not needed to accomplish the proportioning. In fact, liquid fluid power supplied to the proportioner, in the absence of any electrical energy, can be used to accomplish the proportioning. As a consequence, the present proportioner can be smaller, less complicated, and lower in cost than other equipment on the market.

The kinetic proportioner can be used to feed any type of coating application device that requires a pressurized supply of the coating composition, as will be readily appreciated by the skilled artisan.

In the embodiments shown, the volumetric displacement of each piston movement determines the ratio of components. It is possible for the cylinders and/or the piston rods to be replaceable in order to provide various volumetric ratios.

The volumetric proportioner is preferably readily disassembled for facile cleaning.

For homogenously blending and mixing the components of the composition prior to coating, a static mixer is preferable. Such a static mixer is either in communication with, or integral with the spray gun or other coating device. Static mixers, for example with helical baffles within the housing, cause mixing of a plurality of components by creating turbulent flow. The volume of mixed components can be minimized by the close coupling of the mixing device to the spraying device or other means for coating. Alternatively, the components of a composition can be separately sprayed in proximity such that homogenous mixing of the droplets occur in the air, and/or on the substrate. Such an embodiment may involve dual nozzled spray guns or mixing the components during atomization.

The present method of applying coatings is not limited with regard to the coating composition to be applied. In addition to conventional refinish coating compositions, novel compositions can be advantageously employed, for example as described in commonly assigned and copending U.S. Pat. No. 5,260,101 and U.S. Ser. No. 07/780,062 filed Oct. 21, 1991, both hereby incorporated by reference in their entirety. The present method may be used to apply coating compositions such as primers, basecoats, topcoats, or clearcoats. However, the present method is especially convenient for applying clearcoats and primers, since they are normally one color and therefore do not require color changes between applications, and it is therefore not necessary to use solvents to purge the equipment between use. However, it may be just as convenient to apply pigmented coatings when refinishing a substantial number, or fleet, of cars or trucks of the same color.

As indicated above, the present method allows (but does not require) the formulator greater latitude in modifying existing chemistries without being limited to the pot life requirements of existing methods in automotive refinish. Such modifications include, but are not limited to, higher functionality resins, more concentrated or different catalysts, lower VOC, and/or a mix of crosslinkers with different catalyst requirements.

Depending on the needs and the particular application and circumstances, compositions which involve existing chemistries may be modified to provide faster dry/cure time at lower VOC, lower spray viscosity at lower VOC, and/or lower cost.

The present method also allows greater latitude in developing compositions based on new chemistries, for example, compositions having higher reactivities, which compositions have not been previously thought feasible for use with existing methods in automotive refinishing because of pot life requirements.

Depending on the application and particular circumstances or needs, the benefits of compositions involving new chemistries may include improved film properties (for example, resistance to chemicals, UV light, or mechanical damage), durability, lower cost, improved appearance at lower VOC, and/or better atomization at lower VOC.

The above mentioned compositions, either involving modified or new chemistry, may have various VOC levels in response to various dry time and cure time needs, for example for spot repair versus overall repair. Both kinds of compositions may be formulated to lower the risk of user exposure to hazardous/toxic materials, to improve productivity (less labor is involved to measure and mix the components), and/or to reduce waste (less activated material left over and less solvent needed for clean up).

The refinish coating composition for use in the present method may include, but is not limited to, compositions comprising the following combination of functional groups: amine/isocyanate, amine/epoxy/isocyanate, hydroxy/isocyanate, amine/epoxy, epoxy/anhydride, hydroxy/isocyanate/amine, anhydride/hydroxy, or amine/anhydride. The catalyzed reaction of such combinations of functional groups can result in crosslinking polymerization reactions that cause curing of the coating composition. Such compositons range from commercially known systems to systems such as the amine/isocyanate, anhydride/hydroxy, and amine/anhydride that have been hitherto been considered too fast for practical or commercial use.

As an example of one type of coating composition usable in the present method is a two package isocyanate system. Such systems have been difficult to formulate because of pot life concerns. Conventionally, a conflict occurs between the need to accelerate cure and the need to retard viscosity increasing in the application equipment. Two package isocyanate systems, for use in refinish applications, contain isocyanate groups which, depending on the particular composition, may react with alcohols, amines, amides, or phenols. Both aromatic and aliphatic di- or polyisocyanates are available, for example, toluene diisocyanate (TDI), diphenyl methane diisocyanate (MDI), hexamethylene diisocyanate (HMDI), and isophorone diisocyante, and the like. Owing to the toxicity of low molecular weight or volatile isocyanates, polyfunctional isocyanate adducts, which may be derived from diisocyanates, are preferable. Conventional two package finishes based on hydroxy functional resins and isocyanate adducts have found wide application with curing at atmospheric temperatures or moderate curing conditions. Suitable resins include polyester, polyether, epoxy, acrylic, and alkyd resins. Two package hydroxy functional acrylic resins, also referred to as acrylic urethanes, are frequently used in refinishing. Such compositions exhibit a good combination of durability, gloss retention, hardness, flexibility, and high gloss. By using relatively low molecular weight acrylic resin, the solids content can be high. Although the crosslinking reaction with polyisocyanate takes place across a range of temperatures, even below 5° C., the application of heat will generally accelerate through-drying. For optimum bodyshop throughput, acrylic urethanes are typically cured for 30–40 minutes at 80°–100° C., leading to a metal temperature of about 60° C. maximum.

Figure 4:
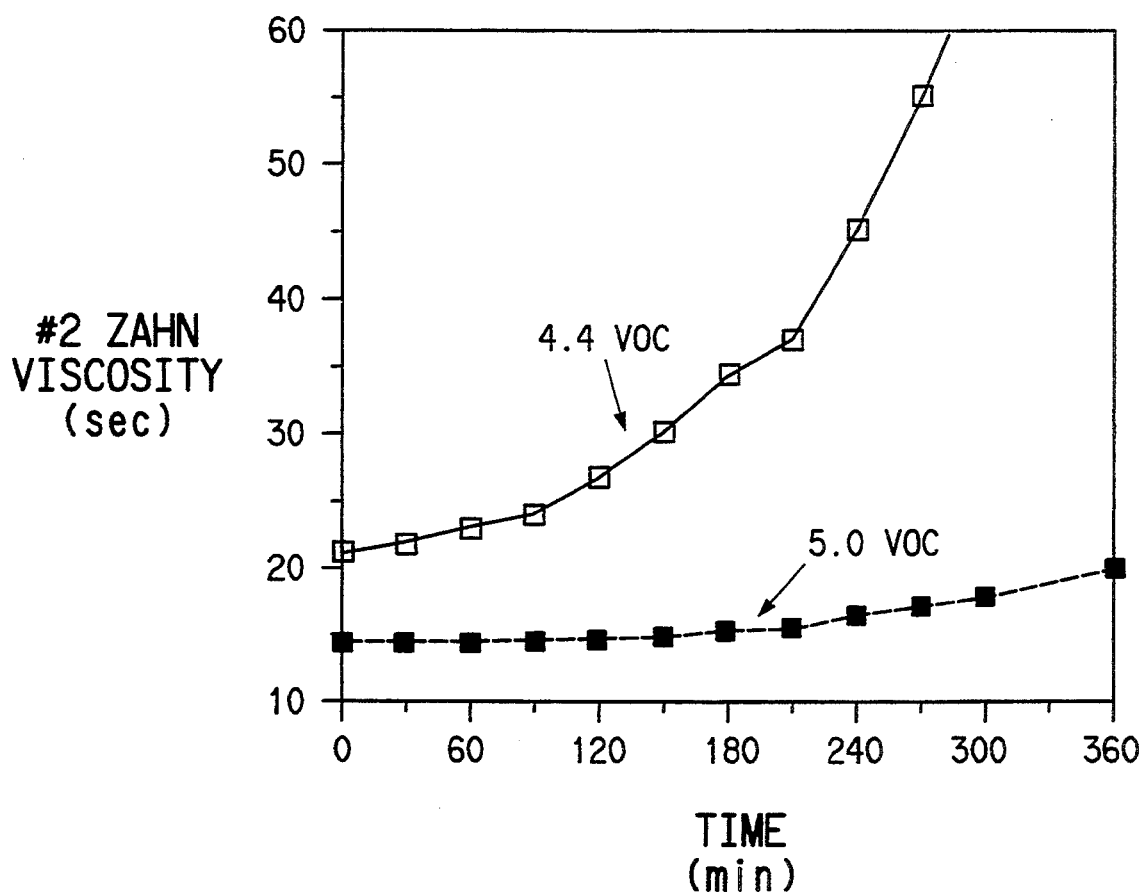
FIG. 4 is a graph showing the pot life, as determined by a parameter known as the #2 Zahn viscosity (sec), versus time (min) for a 5.0 lbs/gal VOC clearcoat composition and for the same clearcoat composition except having 4.4 lbs/gal VOC.

FIG. 4 shows a graph of the viscosity versus time for two acrylic urethane clearcoats having different VOC levels. It is apparent that the 4.4 lb/gal VOC clearcoat, compared to the 5.0 lb/gal VOC clearcoat, has an initially high viscosity which rapidly increases. The lower VOC clearcoat, several hours after mixing, would thus present difficulties in spraying according to previous methods. In contrast, if such a clearcoat were applied according to the present method, mixing would only occur immediately before spraying, after being proportioned out of its container under pressure. Consequently, there would be no pot life problems.

While the preferred embodiments of this invention have been described above in detail, it is to be understood that variations and modifications can be made therein without departing form the spirit and scope of the present invention as set forth in the appended claims.

What is claimed is:

1. A method of applying a two package system for a refinish clearcoat or topcoat composition onto the surface of an automotive substrate and curing the applied composition at a maximum temperature of 100°, the method comprising:
   (a) opening at least one container comprising the two package system to the atmosphere and placing it in a pressure pot such that the component in said container is under compressed air at a pressure of 20 to 80 psig in order to provide the component to a volumetric proportioner under pressure;
   (b) introducing both components comprising the two package system into a volumetric proportioner comprising two pistons and cylinders, said pistons and cylinders being essentially powered by the pressurization of said components or component by said compressed air, so that the volumetric proportioner provides a controlled ratio of the components in accordance with the stoichiometric needs of the chemistry of the refinish coating composition;

(c) subsequent to exiting the proportioner, mixing the components to produce a homogenous refinish clearcoat or topcoat composition; and (d) coating the refinish clearcoat or topcoat composition onto the surface of an automotive substrate, in order to refinish the same, where the coating is dried and cured.

2. The method of claim 1, wherein a fluid control valve in the proportioner directs at least one component into a cylinder, within which a piston is fittingly engaged, and wherein the movement under pressure of the component into a first end of the cylinder effects the movement of the piston to displace an amount of the same component, present on the other side of the piston, out the other end of the cylinder, and wherein when the piston finishes its movement in one direction, the fluid control valve alternates the passageways for the component into and out of the cylinder, so that the piston is then moved, under pressure of the incoming component, in the opposite direction, and wherein the aforesaid operation occurs cyclically so that the piston has a reciprocating movement that causes positive displacement of the component.

3. The method of claim 2, wherein each component enters and exits a fluid control valve which may be the same or separate for each component.

4. The method of claim 2, wherein each of the components are sent by at least one fluid control valve to separate cylinders having separate pistons, and the pistons or piston rods are connected together so that their strokes are equal in length and occur simultaneously.

5. The method of claim 4, wherein the position of the pistons are detected by a pilot control valve, which sends a pilot signal to the fluid control valve to effect the switching of the pathways of the components into and out of the cylinders.

6. The method of claim 5, wherein the pilot control valve is actuated by air and sends an air signal to each each fluid control valve to move a spool which effects a direction change of the fluid components.

7. The method of claim 2, wherein the fluid control valves are switched by physical contact of a cycling member with the fluid control valves or the spool ends thereof.

8. The method of claim 1, wherein the proportioner is self-driven, non-motorized, and powered exclusively by pressurized fluid.

9. The method of claim 1, wherein at least one of said containers for supplying a component is adapted to be pressurized and has a means for introducing pressurized gas and a means for supplying the component into a conduit leading to the proportioner.

10. The method of claim 9, wherein said means for supplying the component comprises a dip tube extending towards the bottom of the container, and the means for introducting pressurized gas comprises a one way valve.

11. The method of claim 1, wherein the containers for one or more components are pressurized in a pressure pot.

12. The method of claim 1, wherein at least one component in its container is maintained at a pressure of 10 to 80 psig.

13. The method of claim 1, wherein the coating composition consists of two components such that, after the components are mixed, crosslinking reactions occur between at least one film forming polymer and at least one crosslinking resin contained in one or both of the components.

14. The method of claim 1, wherein both containers comprising the two-package system are opened to the atmosphere and placed in the pressure pot.

* * * * *